(12) United States Patent
Hayem et al.

(10) Patent No.: US 7,984,216 B2
(45) Date of Patent: Jul. 19, 2011

(54) METHOD AND SYSTEM FOR A RFIC MASTER

(75) Inventors: Frederic Hayem, San Diego, CA (US); Andrew du Preez, San Diego, CA (US); Louis Botha, San Diego, CA (US); Johan (Hendrik) Conroy, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/543,008

(22) Filed: Aug. 18, 2009

(65) Prior Publication Data
US 2009/0307402 A1    Dec. 10, 2009

Related U.S. Application Data

(63) Continuation of application No. 11/353,904, filed on Feb. 14, 2006, now Pat. No. 7,577,779.

(51) Int. Cl.
| | |
|---|---|
| *G06F 13/00* | (2006.01) |
| *G06F 1/04* | (2006.01) |
| *G06F 1/12* | (2006.01) |
| *G06F 5/06* | (2006.01) |
| *H04M 11/00* | (2006.01) |
| *H04M 1/00* | (2006.01) |

(52) U.S. Cl. ..... 710/110; 713/600; 455/403; 455/552.1; 455/553.1

(58) Field of Classification Search ................ 710/110; 713/500, 501, 600; 455/403, 552.1, 553.1
See application file for complete search history.

(56) References Cited

U.S. PATENT DOCUMENTS

| | | | |
|---|---|---|---|
| 5,722,040 A | 2/1998 | Bjerede et al. | |
| 5,790,817 A | 8/1998 | Asghar et al. | |
| 5,920,891 A | 7/1999 | Steinbach et al. | |

(Continued)

FOREIGN PATENT DOCUMENTS

EP    996235 A2 *    4/2000

(Continued)

OTHER PUBLICATIONS

Kaczman et al., "A Single-Chip 10-Band WCDMA/HSDPA 4-Band GSM/EDGE SAW-less CMOS Receiver With DigRF 3G Interface and 90 dBm IIP2," Mar. 2009, IEEE, IEEE Journal of Solid-State Circuits, vol. 44, No. 3, pp. 718-739.*

(Continued)

*Primary Examiner* — Faisal M Zaman
(74) *Attorney, Agent, or Firm* — McAndrews, Held & Malloy, Ltd.

(57) ABSTRACT

Methods and systems for a RFIC master are disclosed. Aspects of one method may include configuring an on-chip programmable device that may function as a master on a bus that has at least one device interface, for example, RFIC interface, coupled to the bus. The on-chip programmable device may generate at least one signal to control at least one device coupled to at least one device interface. The on-chip programmable device may communicate the generated signal via the bus upon receiving an input timer signal and may be configured by writing at least one event data and an index-sample data to the on-chip programmable device. The index-sample data may comprise at least a count value and an event data index. When the count value equals a value of the timer signal, event data may be fetched and executed starting with the one specified by the event data index.

19 Claims, 10 Drawing Sheets

U.S. PATENT DOCUMENTS

| | | | |
|---|---|---|---|
| 6,029,239 | A | 2/2000 | Brown |
| 6,760,321 | B2 * | 7/2004 | Shamsunder ............... 370/342 |
| 6,785,556 | B2 | 8/2004 | Souissi |
| 6,885,861 | B2 | 4/2005 | Koskelainen |
| 6,919,858 | B2 * | 7/2005 | Rofougaran ............... 343/850 |
| 6,952,594 | B2 | 10/2005 | Hendin |
| 6,987,978 | B2 * | 1/2006 | Masuda et al. ............ 455/456.4 |
| 7,046,977 | B2 * | 5/2006 | Khlat et al. ............... 455/260 |
| 7,099,648 | B2 * | 8/2006 | Khorram .................. 455/333 |
| 7,142,882 | B2 | 11/2006 | Schmidt |
| 7,197,578 | B1 | 3/2007 | Jacobs |
| 7,224,705 | B2 * | 5/2007 | Piirainen ................. 370/503 |
| 7,248,658 | B2 * | 7/2007 | Zalio ..................... 375/355 |
| 7,296,186 | B2 | 11/2007 | So et al. |
| 7,333,829 | B2 | 2/2008 | Malone et al. |
| 7,577,779 | B2 | 8/2009 | Hayem et al. |
| 7,656,897 | B2 * | 2/2010 | Liu ...................... 370/467 |
| 7,668,528 | B2 * | 2/2010 | Rofougaran ............... 455/343.3 |
| 7,750,845 | B2 * | 7/2010 | Lethbridge ............... 342/357.22 |
| 7,796,649 | B2 * | 9/2010 | Jeong et al. ............... 370/480 |
| 7,835,327 | B2 * | 11/2010 | Hahm et al. ............... 370/335 |
| 2002/0131390 | A1 * | 9/2002 | Kuo et al. ................. 370/342 |
| 2002/0159434 | A1 | 10/2002 | Gosior et al. |
| 2003/0067894 | A1 | 4/2003 | Schmidt |
| 2003/0067902 | A1 | 4/2003 | Skeba |
| 2003/0203720 | A1 | 10/2003 | Oosawa et al. |
| 2004/0085918 | A1 * | 5/2004 | Shamsunder ............... 370/320 |
| 2004/0185899 | A1 | 9/2004 | Hayem et al. |
| 2004/0203911 | A1 * | 10/2004 | Masuda et al. ............. 455/456.1 |
| 2004/0204038 | A1 | 10/2004 | Suzuki et al. |
| 2004/0225783 | A1 | 11/2004 | Erickson et al. |
| 2005/0020299 | A1 | 1/2005 | Malone et al. |
| 2005/0064856 | A1 | 3/2005 | Atkin et al. |
| 2005/0064892 | A1 | 3/2005 | Cavin |
| 2005/0094584 | A1 | 5/2005 | Kluge et al. |
| 2005/0107077 | A1 | 5/2005 | Hintermeier et al. |
| 2006/0004938 | A1 | 1/2006 | Matthews et al. |
| 2006/0031618 | A1 | 2/2006 | Hansquine et al. |
| 2006/0084469 | A1 | 4/2006 | Malone et al. |
| 2006/0211596 | A1 | 9/2006 | Pisek et al. |
| 2006/0268777 | A1 | 11/2006 | Schmidt |
| 2007/0090874 | A1 | 4/2007 | Sorrells et al. |
| 2007/0161459 | A1 | 7/2007 | Watson |
| 2007/0177617 | A1 * | 8/2007 | Noh et al. ................. 370/401 |
| 2007/0191007 | A1 | 8/2007 | Hayek et al. |
| 2007/0225034 | A1 | 9/2007 | Schmidt |
| 2007/0242651 | A1 | 10/2007 | Hayem |
| 2008/0130674 | A1 * | 6/2008 | Ahmed-Ouameur et al. 370/441 |
| 2008/0139156 | A1 * | 6/2008 | Behzad et al. ............. 455/296 |
| 2009/0034482 | A1 * | 2/2009 | Hahm et al. ............... 370/335 |
| 2009/0092117 | A1 * | 4/2009 | Jiang et al. ............... 370/342 |
| 2009/0103489 | A1 * | 4/2009 | Khlat et al. ............... 370/331 |
| 2009/0104900 | A1 | 4/2009 | Lee |
| 2009/0131101 | A1 | 5/2009 | Van Rooyen |
| 2009/0147895 | A1 * | 6/2009 | McKown .................. 375/354 |
| 2009/0147899 | A1 * | 6/2009 | Arviv et al. ............... 375/359 |
| 2009/0221319 | A1 * | 9/2009 | Lan et al. ................. 455/550.1 |
| 2009/0259783 | A1 | 10/2009 | Solomon et al. |

FOREIGN PATENT DOCUMENTS

| | | |
|---|---|---|
| EP | 1523150 | 4/2005 |
| JP | 06120949 A | 4/1994 |
| JP | 2001313576 | 11/2001 |
| JP | 2003143656 A * | 5/2003 |
| JP | 2003283371 A * | 10/2003 |
| JP | 2003332441 A | 11/2003 |
| JP | 2005286806 A * | 10/2005 |
| JP | 2007082057 A * | 3/2007 |
| JP | 2007208427 A | 8/2007 |
| WO | WO 2004036783 A1 * | 4/2004 |
| WO | WO 2004-062137 | 7/2004 |
| WO | WO 2007091127 A1 * | 8/2007 |

OTHER PUBLICATIONS

Yanduru et al., "A WCDMA, GSM/GPRS/EDGE receiver front end without interstage SAW filter," Jun. 11-13, 2006, IEEE, IEEE Radio Frequency Integrated Circuits (RFIC) Symposium, pp. 1-4.*

Ryynanen et al., "A single-chip multimode receiver for GSM900, DCS1800, PCS1900, and WCDMA, " Apr. 2003, IEEE, IEEE Journal of Solid-State Circuits, vol. 38, No. 4, pp. 594-602.*

Yanduru et al., "RF receiver front-end with +3dBm out-of-band IIP3 and 3.4dB NF in 45nm CMOS for 3G and beyond," Jun. 7-9, 2009, IEEE, IEEE Radio Frequency Integrated Circuits Symposium, pp. 9-12.*

Mullen, Robert A., "RF Design Methodologies Bridging System-IC-Module Design", Jan. 2004, IEEE Press, Proceedings of the 2004 conference on Asia South Pacific design automation: electronic design and solution fair with EDA Technofair Design Automation Conference Asia and South Pacific, pp. 491-498.

Kim, Bruce C.; Force, Craig, "Guest Editors' Introduction: The Evolution of RFIC Design and Test," Design & Test of Computers, IEEE , vol. 25, No. 1, pp. 6-8, Jan.-Feb. 2008.

Ferrario, J.; Wolf, R.; Moss, S.; Slamani, M., "A low-cost test solution for wireless phone RFICs," Communications Magazine, IEEE , vol. 41, No. 9, pp. 82-88, Sep. 2003.

Shimpi, Arland Lal, "Intel Pentium 4 2.0 GHz: The clock strikes two", Aug. 27, 2001, AnanclTech, p. 2, retrieved from the Internet on Dec. 19, 2008 at http://www.anandtech.com/printarticle.aspx?i=1524.

"PCI Local Bus Specification", Revision 2.1, Jun. 1, 1995, PCI Special Interest Group, p. 4.

Definition of "CPU", Microsoft Computer Dictionary, Fifth Edition, 2002, Microsoft Corporation, p. 132.

European Search Report for Application No. 06019928, May 14, 2007.

* cited by examiner

| Instruction Code | Operation |
|---|---|
| 000 | HB<Addr> <= <Data> |
| 001 | HB<addr> <= ACCU |
| 010 | ACCU <= HB<Addr> OR <Data> |
| 011 | ACCU <= HB<Addr> AND <Data> |
| 100 | HB<Addr> <= HB<Addr> OR <Data> |
| 101 | HB<Addr> <= HB<Addr> AND <Data> |
| 110 | ACCU <= ACCU XOR <Data> |
| 111 | HB<Addr> <= <Data> if (ACCU = 0) |

FIG. 3e

METHOD AND SYSTEM FOR A RFIC MASTER

CROSS-REFERENCE TO RELATED APPLICATIONS/INCORPORATION BY REFERENCE

The present application is a CONTINUATION of U.S. application Ser. No. 11/353,904, filed Feb. 14, 2006.

This application makes reference to U.S. application Ser. No. 11/354,704, filed Feb. 14, 2006

The above-identified applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to controlling chip functionality. More specifically, certain embodiments of the invention relate to a method and system for a RFIC master.

BACKGROUND OF THE INVENTION

Generally, in a communication system, ICs and device circuitry may need to be initialized and controlled. This is mostly done by boot code during power-up or reset. For example, one IC in a mobile terminal may be a RF IC, which may receive analog signals from the antenna and process it to a baseband signal and/or process a baseband signal to RF frequencies for transmission via the antenna. The RF IC may have a plurality of functional components, such as, for example, power amplifiers, digital-to-analog converters (DAC), and local oscillator frequencies, that may need to be controlled after initial power up.

These functionalities may need to be controlled via a plurality of interfaces, such as, for example, general purpose I/O (GPIO) interface, a three-wire serial interface (TWIF), and DAC control signal interfaces. However, since these interfaces may be relatively slow with respect to a main processor's operational speed, hardware control logic may be utilized for controlling the functionality of the RF IC in order to allow more efficient use of the processor. The hardware control logic may be duplicated in the plurality of interfaces that may communicate command and/or status to the RF IC. This duplication may increase the gate count and die size of a chip. Since there must be indications to the hardware control logic for specific commands that may need to be sent to the RF IC, a control signal may need to be communicated from, for example, a central timer to each the plurality of interfaces.

A disadvantage may be that as the number of different interfaces increases, the number of control signals to the plurality of interfaces may need to increase. This may be a concern since the logic that generates the control signals may need to be redesigned. There may also be layout considerations, signal drive considerations, and pin-out considerations. Still another disadvantage may be the duplication of the hardware control logic for the plurality of interfaces, with the inherent waste in chip space and the additional power dissipated by the various hardware logic.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a RFIC master, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3e illustrates exemplary instructions for the RFIC master, in accordance with an embodiment of the invention.

DETAILED DESCRIPTION OF THE INVENTION

Certain embodiments of the invention may be found in a method and system for a RFIC master. Aspects of the method may comprise configuring an on-chip programmable device from within the chip, where the on-chip programmable device functions as a master on a bus. The bus may have at least one device interface, for example, a radio frequency integrated circuit (RF IC) interface, coupled to it. The on-chip programmable device may generate at least one signal to control at least one device coupled to the device interface. The device that is controlled may be on-chip or off-chip. The on-chip programmable device may also communicate the generated signal, via the bus, upon receiving an input timer signal that triggers the communication.

The timer signal may comprise a count that correlates to a number of WCDMA chip periods. For example, the timer signal count may be four times the number of WCDMA chips detected since the start of a present WCDMA slot. This timer signal count may be communicated when, for example, a WCDMA core processor is in active mode, or awake. The timer signal may also comprise a count of a number of time periods, where the time period may be greater than a WCDMA chip period. This may occur when, for example, the WCDMA core processor is in stand-by mode, or asleep.

The on-chip programmable device may be configured by writing at least one event data and by writing an index-sample data to the on-chip programmable device. The index-sample data may comprise at least a count value and an event data index. When the count value equals a value of the timer signal, the event data specified by the event data index may be fetched. The event data may comprise a data field, an address field, and a 3-bit instruction field. The instruction in the instruction field may be executed, and then the next event data may be fetched. However, if the index-sample data comprises a specified value, for example, all logic ones, an idle state may be entered where the event data may not be fetched or executed.

Figure 1B:
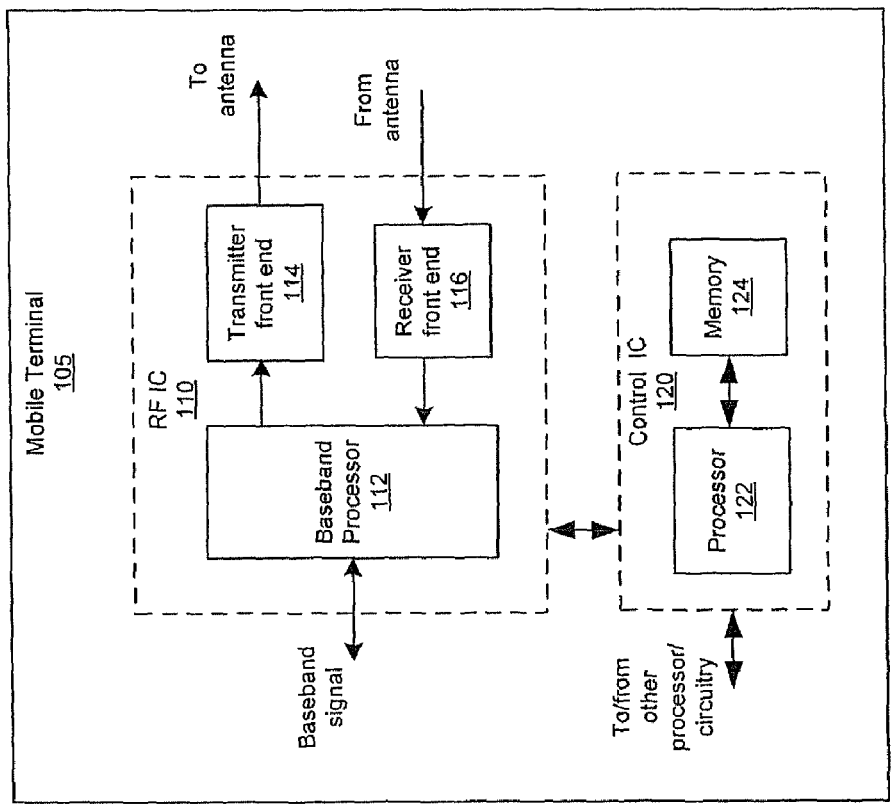
FIG. 1b is an exemplary block diagram of a portion of a mobile terminal, which may be utilized in connection with an embodiment of the invention.
Figure 1A:
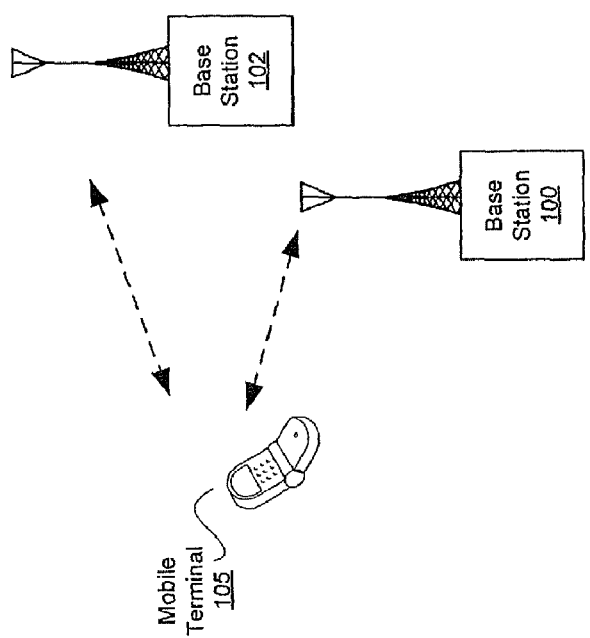
FIG. 1a is diagram of an exemplary mobile terminal that communicates with a base station, which may be utilized in connection with an embodiment of the invention.

FIG. 1a is a diagram of an exemplary mobile terminal that communicates with a base station, which may be utilized in connection with an embodiment of the invention. Referring to FIG. 1a, there is shown base stations 100 and 102, and a mobile terminal 105. The mobile terminal 105 may be, for example, a WCDMA handset that may have voice and/or data capability. The mobile terminal 105 may utilize 3G technology such as, for example, high-speed downlink packet access (HSDPA) that may allow data throughput of to the order of several mega bits per second. The mobile terminal 105 may communicate with at least one base station. In this manner, the mobile terminal 105 may be handed off from one base station to another via soft handoff.

FIG. 1b is an exemplary block diagram of a portion of a mobile terminal, which may be utilized in connection with an embodiment of the invention. Referring to FIG. 1, there is shown a mobile terminal 105 that may comprise a radio frequency integrated circuit (RF IC) 110 and a control IC 120. The RF IC 110 may comprise a baseband processor 112, a transmitter front end 114, and a receiver front end 116. The control IC 120 may comprise a processor 122 and a memory block 124.

The baseband processor 112 may comprise suitable circuitry, logic, and/or code that may enable processing of digital data for transmission. The processing may comprise, for example, digital filtering, modulation of a baseband signal using the appropriate modulation scheme, and/or converting the baseband signal to an analog signal. The output of the baseband processor 112 may be communicated to, for example, the transmitter front end 114. Modulation may use, for example, quadrature phase shift keying (QPSK). The baseband processor 112 may also process signals received by the mobile terminal to demodulate a baseband signal received from the receiver front end 116. Processing the received signals may comprise, for example, converting the analog baseband signal received from the receiver front end to a digital baseband signal, demodulating the baseband signal, and/or digitally filtering the digital baseband signal.

The transmitter front end 114 may comprise suitable circuitry and/or logic that may enable filtering, and/or amplifying analog signals, and/or converting analog baseband signals to RF signals suitable for transmission. Since the RF transmission frequency may vary depending on the frequency used by a base station, an output frequency of a local oscillator used for upconverting analog signals to RF signals may also be variable. The transmitter front end 114 may also comprise filters and/or power amplifiers that may provide a specific power level for the RF signal.

The receiver front end 116 may comprise suitable circuitry and/or logic that may enable filtering, and/or amplifying received analog signals, and/or converting RF signals to analog baseband signals. Since the received RF frequency may vary according to a base station, an output frequency of a local oscillator used for downconverting RF signals to analog signals may also be variable. The receiver front end 116 may also comprise filters that may be used to attenuate unwanted frequency components of the received signals.

The processor 122 may control the operation of the RF IC 110. For example, the processor 122 may be utilized to update and/or modify programmable parameters and/or values in a plurality of components, devices, and/or processing elements in the baseband processor 112, the transmitter front end 114, and/or the receiver front end 116. The processor 122 may determine the mode of operation of the transmitter front end 114. For example, the processor 112 may select a specific frequency for a local oscillator, or a specific gain for a power amplifier. Moreover, the specific frequency selected and/or parameters needed to calculate the specific frequency, and/or the specific gain value and/or the parameters needed to calculate the specific gain, may be stored in the memory block 124 by the processor 112.

Similarly, the processor 122 may determine the mode of operation of the receiver front end 116. For example, the processor 112 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the memory block 124 by the processor 112.

The information stored in memory block 124 may be transferred to the transmitter front end 114 from the memory block 124, by, for example, the processor 112 and/or hardware logic in the control IC 120. The memory block 124 may comprise suitable logic, circuitry, and/or code that may be adapted to store a plurality of control and/or data information, including parameters needed for calculation of frequencies and/or gain.

In operation, the control IC 120 may communicate various control signals and parameters to, for example, the RF IC 110. For example, when the mobile terminal is not transmitting, power amplifiers in the RF IC 110 may be turned off to reduce power dissipation. Similarly, the power amplifiers may need to be turned on when the mobile terminal is ready to transmit. Gain of the power amplifiers may also need to be changed in accordance with power control signals from a base station. Accordingly, the control IC 120 may communicate appropriate commands to the transmitter front end 114 to turn on, turn off, or change the gain of power amplifiers in the RF IC 110. Similarly, the control IC 120 may communicate control signals to a DAC in the baseband processor 112 to either ramp up the output power when there is data to transmit or ramp down output power when there is no data to transmit.

Figure 2A:
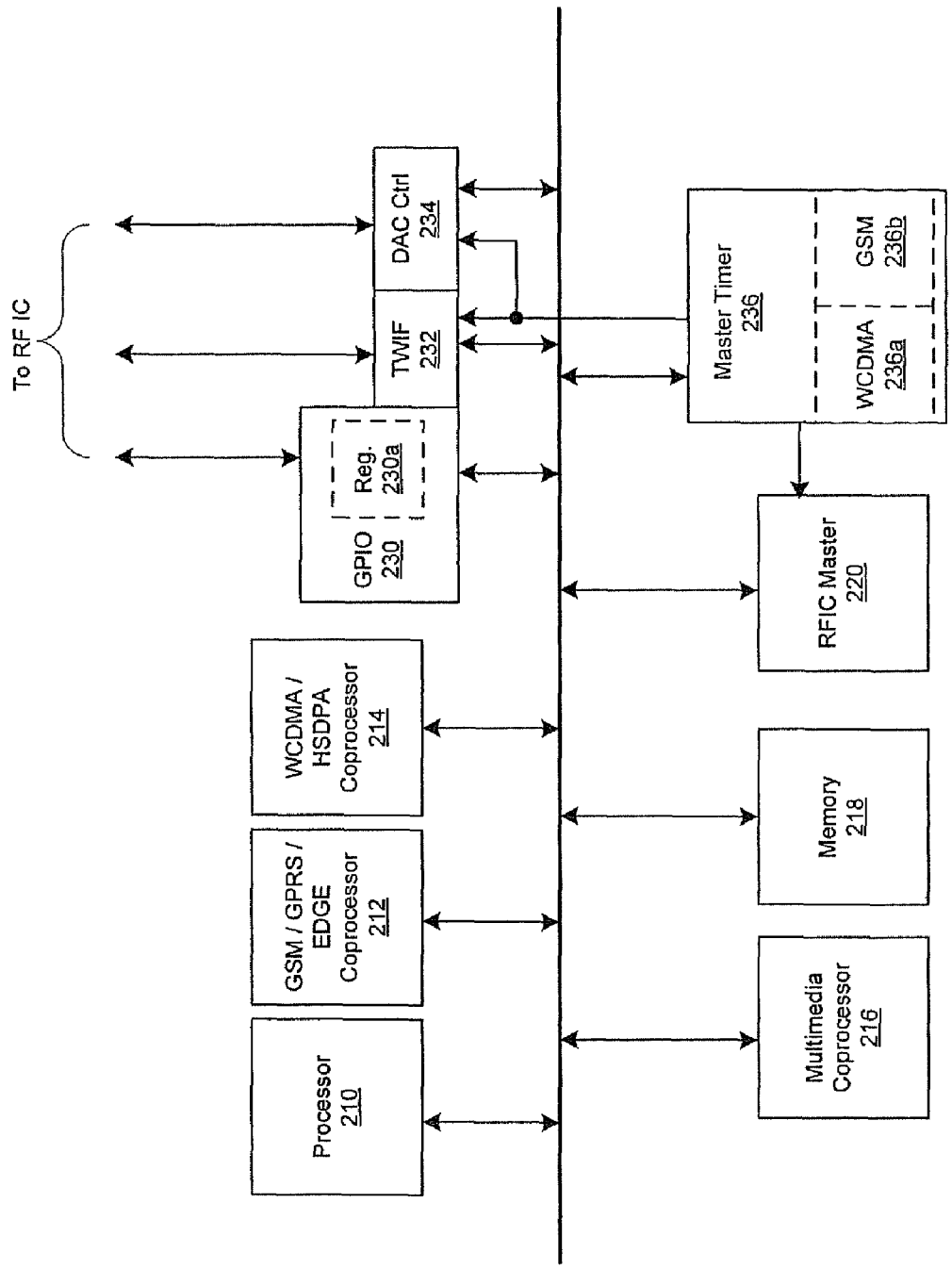
FIG. 2a is a block diagram illustrating an exemplary single bus architecture, which may be utilized in connection with an embodiment of the invention.

FIG. 2a is a block diagram illustrating an exemplary single bus architecture, which may be utilized in connection with an embodiment of the invention. An exemplary embodiment of the invention may utilize a single bus for communication among various devices. For example, referring to FIG. 2a, there is shown various circuitry that share a common bus. The circuitry shown are a processor 210, a GSM/GPRS/EDGE coprocessor 212, a WCDMA/HSDPA coprocessor 214, a multimedia coprocessor 216, a memory block 218, a RFIC master block 220, a general purpose input/output interface (GPIO) block 230, a three-wire interface (TWIF) block 232, a digital-to-analog converter (DAC) control block 234, and a master timer block 236. The master timer block 236 may comprise a plurality of master timers 236a and 236b.

The processor 210 may be similar to the processor 122 and the memory block 218 may be similar to the memory block 124. The GSM/GPRS/EDGE coprocessor 212 may be a processor that may enable processing and/or controlling of data received and/or to be transmitted via the GSM technology, and/or the related GPRS technology and/or EDGE technology. This may off-load some of the tasks from the processor 210. The GSM technology may be considered to be a second generation (2G) wireless communication technology, and the GPRS and EDGE technologies may be considered to be 2.5G technologies. The 2.5G technologies may be enhancements to 2G technologies that technologies provide better data throughput for a mobile terminal.

The WCDMA/HSDPA coprocessor 214 may be a processor that may enable processing and/or controlling of data received and/or to be transmitted via the WCDMA and/or HSDPA technologies. This may off-load some of the tasks from the processor 210. The WCDMA/HSDPA technologies may be considered to be a third generation (3G) wireless communication technology.

The multimedia coprocessor 216 may be a processor that may enable processing and/or controlling of multimedia data. For example, video data may be received, and displayed on the mobile terminal. The multimedia coprocessor 216 may execute the steps required for displaying the video. This may off-load some of the tasks from the processor 210.

The RFIC master block 220 may comprise suitable circuitry, logic, and/or code that may enable controlling of various portions of, for example, the RF IC 110. The various portions of the RF IC 110 may be controlled with commands and data communicated via a plurality of interfaces, such as, for example, GPIO, TWIF, and DAC control interfaces.

The GPIO block 230 may comprise suitable circuitry and/or logic that may enable transfer of information between, for example, the processor 210 and/or the RFIC master block 220 and the RF IC 110. This may be accomplished via a plurality of bits in a register 230a, for example, where each bit in the register 230a may be asserted or de-asserted. The state of the bits may be communicated to, for example, the RF IC 110. For example, an asserted bit may indicate that a power amplifier in the RF IC 110 may be enabled, while a de-asserted bit may indicate that a power amplifier in the RF IC 110 may be disabled. Similarly, the RF IC 110 may also communicate information to, for example, the processor 210.

The TWIF block 232 may comprise suitable circuitry and/or logic that may enable, for example, writing to registers in the RF IC 110. Data may be written to the TWIF block 232 via a bus from, for example, the RFIC master block 220, and this data may be transmitted serially to the RF IC 110. The DAC control block 234 may comprise circuitry and/or logic that enable, for example, communication of information to DACs in the RF IC 110 for ramping up and ramping down a DAC output.

The master timer block 236 may comprise suitable circuitry and/or logic that may enable generation of timing information for use by the mobile terminal 105. The master timer block 236 may, for example, comprise a counter that may count a number of WCDMA chips in a WCDMA slot, or some other time periods in a WCDMA frame. The master timer block 236 may comprise a plurality of master timers, such as, for example, the WCDMA master timer 236a and the GSM master timer 236b. The separate master timers may provide different timing for WCDMA and GSM technologies, for example. Generally, the WCDMA master timer 236a may be used when the mobile terminal 105 is communicating with a base station that may be using WCDMA technology. Similarly, the GSM master timer 236b may be used when the mobile terminal 105 is communicating with a base station that may be using GSM technology.

The master timer block 236 may utilize different clock speeds depending on whether the core processor circuitry may be in an active mode or in a stand-by mode. For example, if the mobile terminal is communicating utilizing WCDMA technology, when WCDMA core processor is active, a fast clock mode may be used. During periods of time when the WCDMA core processor is in a stand-by mode, a slow clock mode or low power clock mode may be used. Similarly, a fast clock mode and a slow clock mode may also be used for the GSM technology. An advantage to the dual clock method may be, for example, that the mobile terminal 105 may dissipate less power since it is using a slower clock during the stand-by mode.

An exemplary embodiment of the invention may use a counter in the master timer block 236 that is clocked at four times the chip rate in active mode. Accordingly, the count may range from zero to 10,239. During stand-by mode, the counter in the master timer block 236 may be clocked by a slower clocking signal, for example, a clocking signal that may have a frequency of 32 KHz.

Although an embodiment of the invention may be applicable to many different wireless technologies, WCDMA technology is used with respect to descriptions of FIG. 2a and following figures for ease of description. However, the invention need not be so limited. This invention may also be applied to GSM, EDGE, GPRS, HSUPA, CDMA IS95, CDMA2000, IEEE 802.11x, and other technologies where circuitry and/or a chip may need to be controlled at specific times with respect to a radio frame.

In operation, the processor 210 may write appropriate data to the RFIC master block 220. The data may be used by the RFIC master block 220 to write, for example, to the GPIO block 230, the TWIF block 232, and the DAC control block 234. One of the data written by the processor 210 may enable specific write operations to a specific interface. Accordingly, the processor 210 may not have to control specific write processes to certain interfaces at different times. The operation of the RFIC master may be described in more detail with respect to FIGS. 3a, 3b, 3c, 3d, 4, and 5.

Although an embodiment of the invention may have been described as controlling various portions of the off-chip RF IC 110, the invention need not be so limited. For example, other embodiments of the invention may control at least one device on the same chip as the RFIC master block 220, or at least a portion of at least one IC, including the RF IC 110. The label RFIC master block 220 should not be construed to be limited to controlling only portions of the RF IC 110.

Figure 2B:
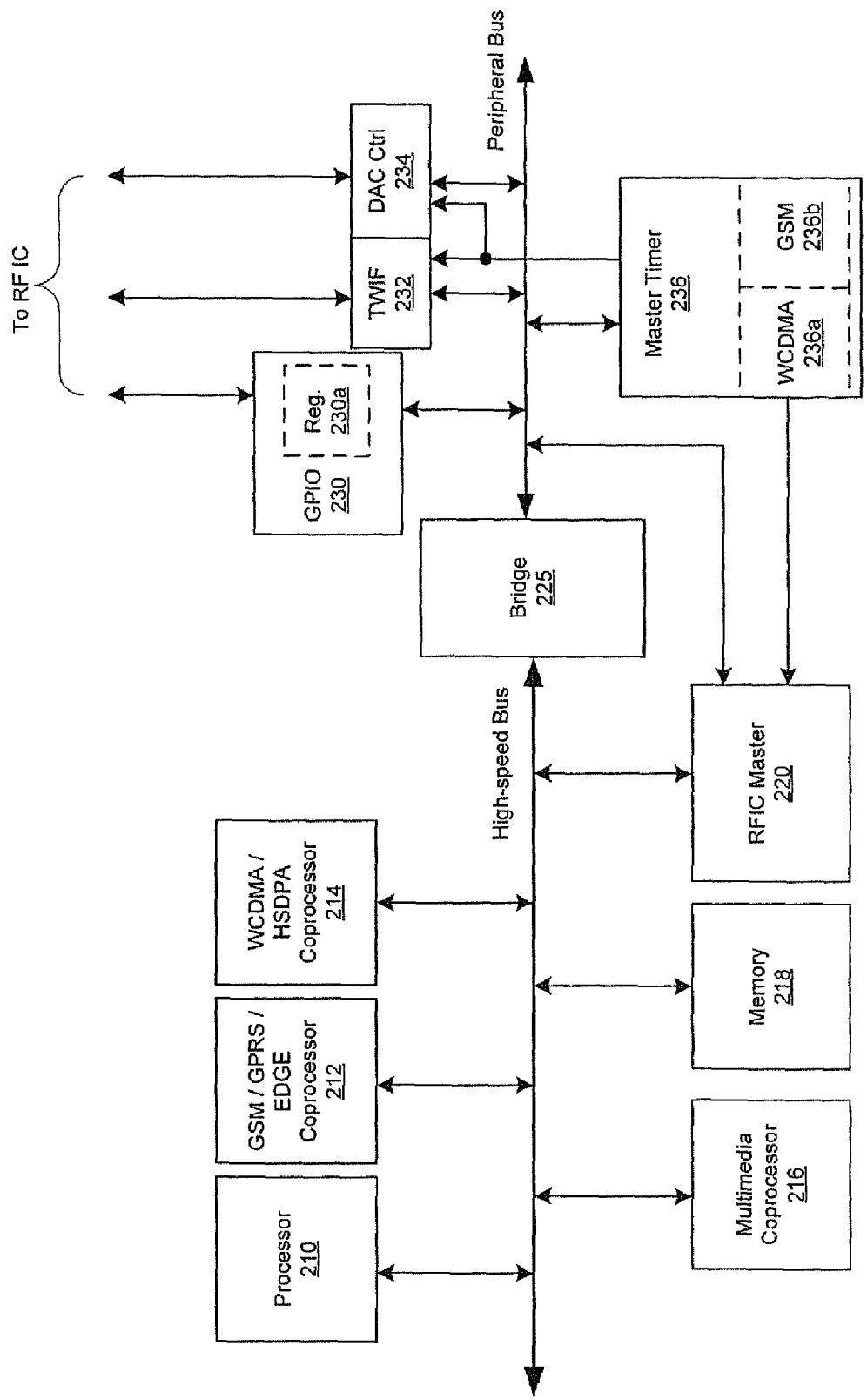
FIG. 2b is a block diagram illustrating an exemplary dual bus architecture, which may be utilized in connection with an embodiment of the invention.

FIG. 2b is a block diagram illustrating an exemplary dual bus architecture, which may be utilized in connection with an embodiment of the invention. An exemplary embodiment of the invention may utilize two busses for communication among various devices. One bus, for example, may be a high-speed bus, and may be dedicated to high-speed, high-bandwidth data traffic. The other bus, for example, may be a lower speed bus that may be dedicated to peripherals that may utilize slower data traffic.

For example, referring to FIG. 2b, there is shown various circuitry that use the two-bus architecture. The circuitry shown that share the high-speed bus may be the processor 210, the GSM/GPRS/EDGE coprocessor 212, the WCDMA/

HSDPA coprocessor 214, the multimedia coprocessor 216, the memory block 218, and the RFIC master block 220. These devices may be similar to the corresponding devices described with respect to FIG. 2*a*.

The circuitry shown that share the high-speed bus may be the general-purpose input/output interface (GPIO) block 230, the three-wire interface (TWIF) block 232, the digital-to-analog converter control block 234, and the master timer block 236. These devices may be similar to the corresponding devices described with respect to FIG. 2*a*.

There is also shown a bridge 225. The bridge 225 may comprise suitable circuitry and/or logic that may enable communication of data from one bus to another. For example, in instances when the processor 210 writes to the master timer block 236, which may be on the peripheral bus, the bridge 225 may receive the data from the processor 210. The bridge 225 may execute appropriate handshaking with the processor 210 to allow the processor to finish its write cycle. The bridge 225 may then transfer the data, originally from the processor 210, to the master timer block 236 at the slower speed of the master timer block 236. Accordingly, the processor 210 may operate efficiently at its faster speed while the bridge 225 handles the actual writes to the master timer block 236. Similarly, data read from the slower devices on the peripheral bus may be collected by the bridge 225, and communicated at a fast speed to the requesting device on the bridge 225. Further, as stated with respect to FIG. 2*a*, the RFIC master block 220 should not be construed to be limited to controlling only portions of the RF IC 110.

Figure 3A:
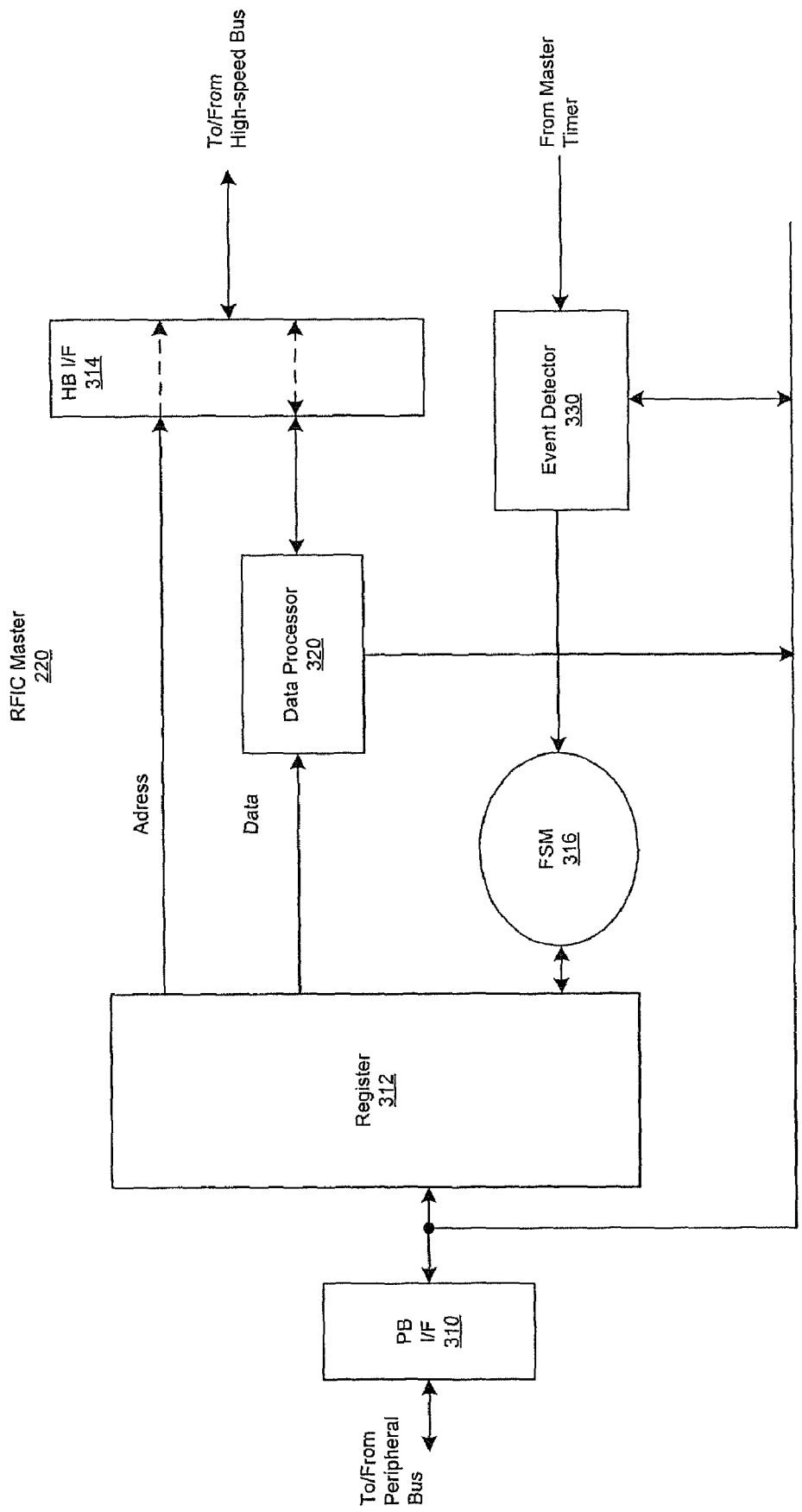
FIG. 3a is a block diagram illustrating exemplary hardware logic for control of RF IC, in accordance with an embodiment of the invention.

FIG. 3*a* is a block diagram illustrating exemplary hardware logic for control of RF IC, in accordance with an embodiment of the invention. Referring to FIG. 3*a*, there is shown a peripheral bus interface 310, a register block 312, a high-speed bus interface 314, a state machine block 316, a data processor block 320, and an event detector 330.

The peripheral bus interface 310 may comprise suitable circuitry and/or logic that enables transferring of data to and/or from the peripheral bus. The register block 312 may comprise suitable circuitry and/or logic that enable storage of data such that the data may also be read. The high-speed bus interface 314 may comprise suitable circuitry and/or logic that enables transferring of data to and/or from the high-speed bus. The state machine block 316 comprises suitable circuitry and/or logic that enable controlling of various circuitry, for example, the register block 312, the data processor block 320.

The data processor block 320 comprises suitable circuitry and/or logic that enables processing of data, for example, from the register block 312, and/or data received via the high-speed bus interface 314. The processing may comprise, for example, logical AND of data, logical OR of data, and logical XOR of data. The processing accomplished by the data processor block 320 may be design dependent.

The event detector 330 may comprise suitable circuitry and/or logic that enables detection of an event time. The detection may be accomplished by comparing a reference event count, which may have been written to the event detector 330 by, for example, the processor 210, with a received timer count, for example, from the master timer block 236.

In operation, the processor 210 may write event data to the register block 312, via the peripheral bus interface 310, where the event data may comprise instructions, address, and data to be used by the RFIC master 220. The processor 210 may then write data, for example, index-sample data, to the event detector 330. The index-sample data may be described in more detail with respect to FIG. 3*c*. A portion of the index-sample data may comprise a reference event count. The processor 210 may compare the reference event count with received timer count from the master timer block 236.

If the reference event count matches the received timer count, the state machine block 316 may leave an idle state and become active. The state machine block 316 may read another portion of the index-sample data, an event data index to the register block 312, to fetch event data from the portion of the register indicated by the event data index. The event data from the register 312 may be parsed, and the instruction portion may be executed by the data processor block 320. The instruction may require data from a data portion of the event data, and/or data via the high-speed bus interface 314. The result of the instruction may be stored in the data processor 320 for use with a subsequent instruction, or transferred to a device on the high-speed bus addressed by the address portion of the index-sample data. Exemplary instructions may be described in more detail with respect to FIG. 3*e*.

After execution of the instruction, the state machine block 316 may fetch the data from the next location of the register block 312. This may continue until an instruction from the register block 312 is executed to write a specified index-sample data. This value of the specified index-sample data may indicate to the state machine block 316 to enter an idle state. This value may be, for example, all logic ones.

Figure 3B:
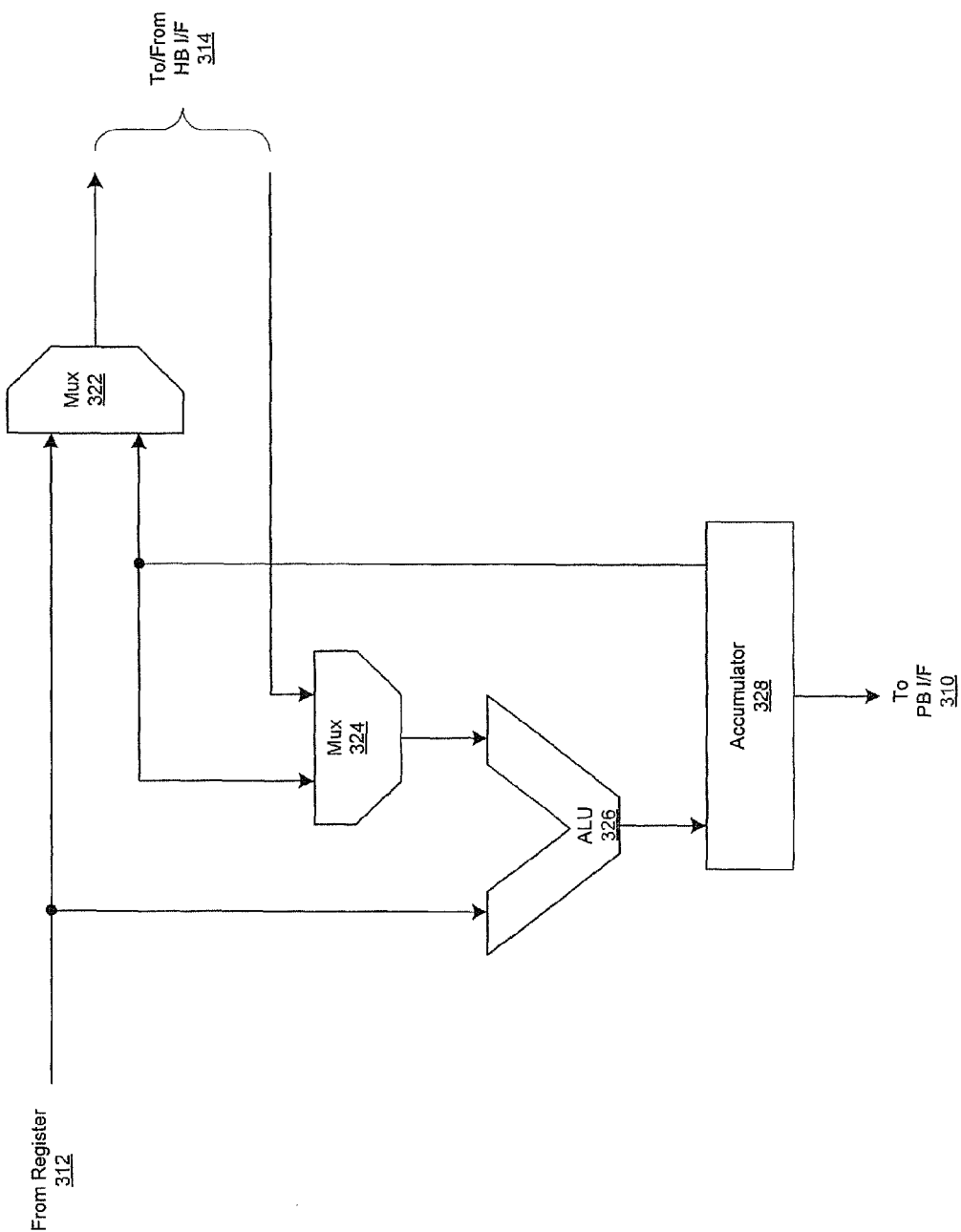
FIG. 3b is a block diagram illustrating an exemplary data processor, in accordance with an embodiment of the invention.

FIG. 3*b* is a block diagram illustrating an exemplary data processor, in accordance with an embodiment of the invention. Referring to FIG. 3*b*, there is shown multiplexers 322 and 324, an arithmetic logic unit (ALU) 326, and an accumulator 328. The ALU 326 may comprise circuitry and/or logic that may enable logical operations of two sets of data. For example, the logical operations may comprise AND, OR, and XOR. The accumulator 328 may comprise circuitry and/or logic that may enable storing of a result from the ALU 326, and communicating the stored result to the multiplexers 322 and/or 324. The result stored in the accumulator 328 may also be read by, for example, the processor 210 via the peripheral bus interface 310.

The data portion of the event data from the register block 312 may be communicated to a first input of the multiplexer 322 and to a first input of the ALU 326. Data may be communicated to a first input of the multiplexer 324 from the high-speed bus interface 314. Data may be communicated to second inputs of the multiplexers 322 and 324 from the accumulator 328. Accordingly, the multiplexer 322 may select either data from the register block 312 or data from the accumulator 328, and the multiplexer 324 may select either the data from the high-speed bus 314 or data from the accumulator 328. The state machine block 316 may control selection of the data at each of the multiplexers 322 and 324, and whether outputs of the multiplexers 322 and 324 are enabled.

The output of the multiplexer 322 may be coupled to the high-speed bus interface 314. The output of the multiplexer 322 may be coupled to a second input of the ALU 326. The state machine block 316 may control the specific operation of the ALU 326 upon the two inputs to the ALU 326. The output of the ALU 326 may be coupled to an input of the accumulator 328. The accumulator 328 may store data from the ALU 326, and this may be under the control of the state machine block 316. The data in the accumulator 328 may be communicated to the multiplexers 322 and 324. The data in the accumulator 328 may also be read by, for example, the processor 210 via the peripheral bus interface 310. The state machine block 316 may control handshaking for the peripheral bus and the high-speed bus.

In operation, the state machine block 316 may determine flow of data through the data processor block 320. The flow of data may be determined based on an instruction portion of the event data from the register block 312. The state machine block 316 may also determine, for example, whether the ALU 326 executes a specific logical operation. For example, an instruction portion of the event data read from the register block 312 may indicate that the data portion of the event data read from the register block 312 may be written to an address indicated by the address portion of the event data read from the register block 312. Accordingly, the state machine block 316 may indicate to the multiplexer 322 to select the data input from the register block 312. The state machine block 316 may also allow the address portion of the event data to be placed, for example, on the high-speed bus. The state machine block 316 may also generate appropriate signals, such as, for example, a write signal and/or an enable signal to allow an high-speed bus write cycle.

Another instruction may instruct the state machine block 326 to perform an XOR operation on the data portion of the event data read from the register block 312 and on the data from the accumulator block 328. The instruction may further indicate to the state machine block 326 to store the result of the XOR operation to the accumulator block 328. Accordingly, the state machine block 316 may disable the multiplexer 322 from generating an output, and may enable the ALU 326 for an XOR operation. The state machine block 316 may indicate to the multiplexer 324 to select data communicated by the accumulator 328 as output of the multiplexer 316. The state machine may further indicate to the accumulator 328 to store the output of the ALU 326. Exemplary instructions that may be read from the register block 312 will be discussed with respect to FIG. 3e.

Figure 3C:
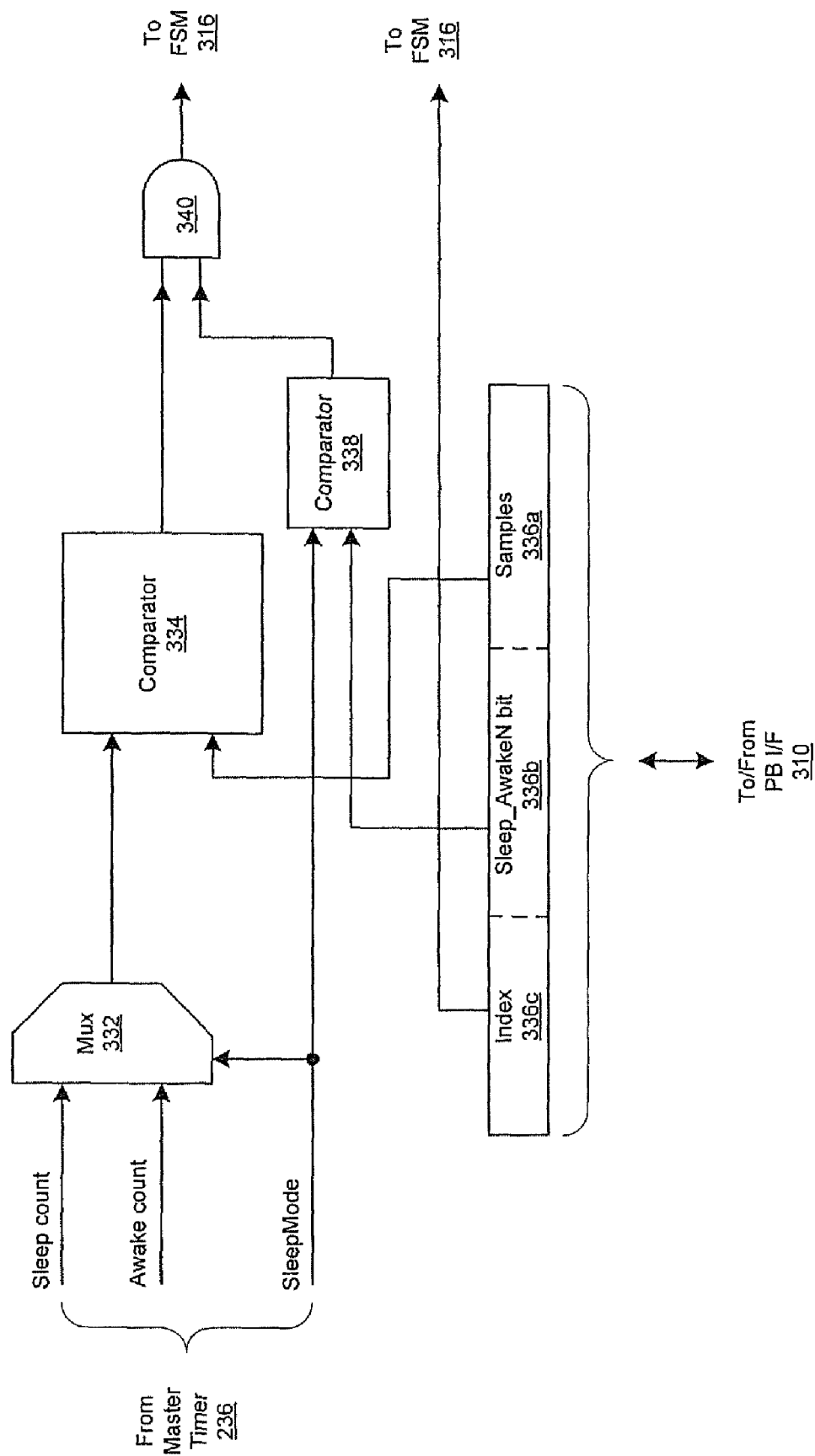
FIG. 3c is a block diagram illustrating an exemplary event detector, in accordance with an embodiment of the invention.

FIG. 3c is a block diagram illustrating an exemplary event detector, in accordance with an embodiment of the invention. Referring to FIG. 3c, there is shown a multiplexer 332, data comparators 334 and 338, an index-sample register 336, and an AND gates 340. An asserted signal in a logic circuit may be either logic zero or logic one, depending on design of the logic circuit. For exemplary purposes, an asserted signal may be assumed to be logic one with respect to FIG. 3c.

The data comparators 334 and 338 may comprise suitable circuitry and/or logic that may enable detection of data at the two inputs that may be equal to each other. When the input data are equal, an output signal may be asserted. Otherwise, the output signal may be de-asserted.

The index-sample register 336 may comprise, for example, a sample field 336a, a sleep field 336b, and an index field 336c. The number of bits allocated to each field may be design dependent. The sample field 336a may comprise a reference event count that may be compared with the timer count that may be communicated by the master timer block 236. The sleep field 236b may comprise, for example, a bit that may indicate whether the WCDMA core processor may be in an active or stand-by mode. The index field 236c may comprise an event data index to the register block 312 where event data may be stored. The event data index may indicate the first event data for an event.

A sleep count and an awake count from the master timer block 236 may be communicated to inputs of the multiplexer 322. The output of the multiplexer 322 may be coupled to a first input of the data comparator 334, and data in the sample field 336a may be communicated to a second input of the data comparator 334. An output of the data comparator 334 may be coupled to a first input of the AND gate 340.

A sleep mode signal, for example, SleepMode from the master timer block 236 may be used, for example, to select one of the two inputs to the multiplexer 332. The sleep mode signal, SleepMode, may also be compared to the sleep field 336b by the data comparator block 338. The output of the data comparator block 338 may be coupled to a second input of the AND gate 340. The output value of the AND gate 340 may be communicated to the state machine block 316.

In operation, a processor, for example, the processor 210 may program the register block 312 with event data. At least one event data may be written to the register block 312 for an event. The processor 210 may then write the index-sample data to the index-sample register 336. The sleep mode signal, SleepMode, may be communicated to the event detector block 330. In the event detector block 330, the sleep mode signal, SleepMode, may be used by, for example, the multiplexer 332 to select an input. If the sleep mode signal, SleepMode, is not asserted, an awake count from the master timer block 236 may be selected as an output by the multiplexer 332. If the sleep mode signal, SleepMode, is asserted, a sleep count from the master timer block 236 may be selected as an output by the multiplexer 332. For example, the awake count may be clocked by a faster clocking signal than the sleep count. This may allow a reduction of dissipated power during the periods of time when core processor circuitry is in sleep mode, which may also be referred to as stand-by mode.

The sleep count and the awake count may be communicated to the event detector 330 via a common interface. However, the sleep count and the awake count may comprise a different number of bits. Accordingly, the counts may be formatted to valid values. For example, the awake count may use fewer bits than the sleep count. Accordingly, the timer count sent by the master timer block 236 during the active mode may be padded with leading zeros to form the awake count that may have the same number of bits as the sleep count. The timer count send during the sleep mode may not be modified.

The data comparator 334 may compare the value of the data from the multiplexer 332 to the value of the data in the sample field 336a. If the value of the data from the multiplexer 332 is the same as the value of the data in the sample field 336a, the data comparator 334 output may be an asserted signal. Otherwise, the data comparator 334 output signal may be a de-asserted signal. The data comparator 334 output signal may be communicated to an input of the AND gate 340.

The sleep mode signal, SleepMode, may also be used by, for example, the data comparator block 338 to determine whether the sleep mode signal, SleepMode, may have the same value as the value of the sleep field 236b. If so, the asserted output may be communicated to an input of the AND gate 340. If both inputs of the AND gate 340 are asserted, the output of the AND gate may also be asserted. Therefore, an asserted output of the AND gate 340 may indicate that an event may start because the value of the sample field 336a may be equal to the timer count from the master timer block 236.

Figure 3D:
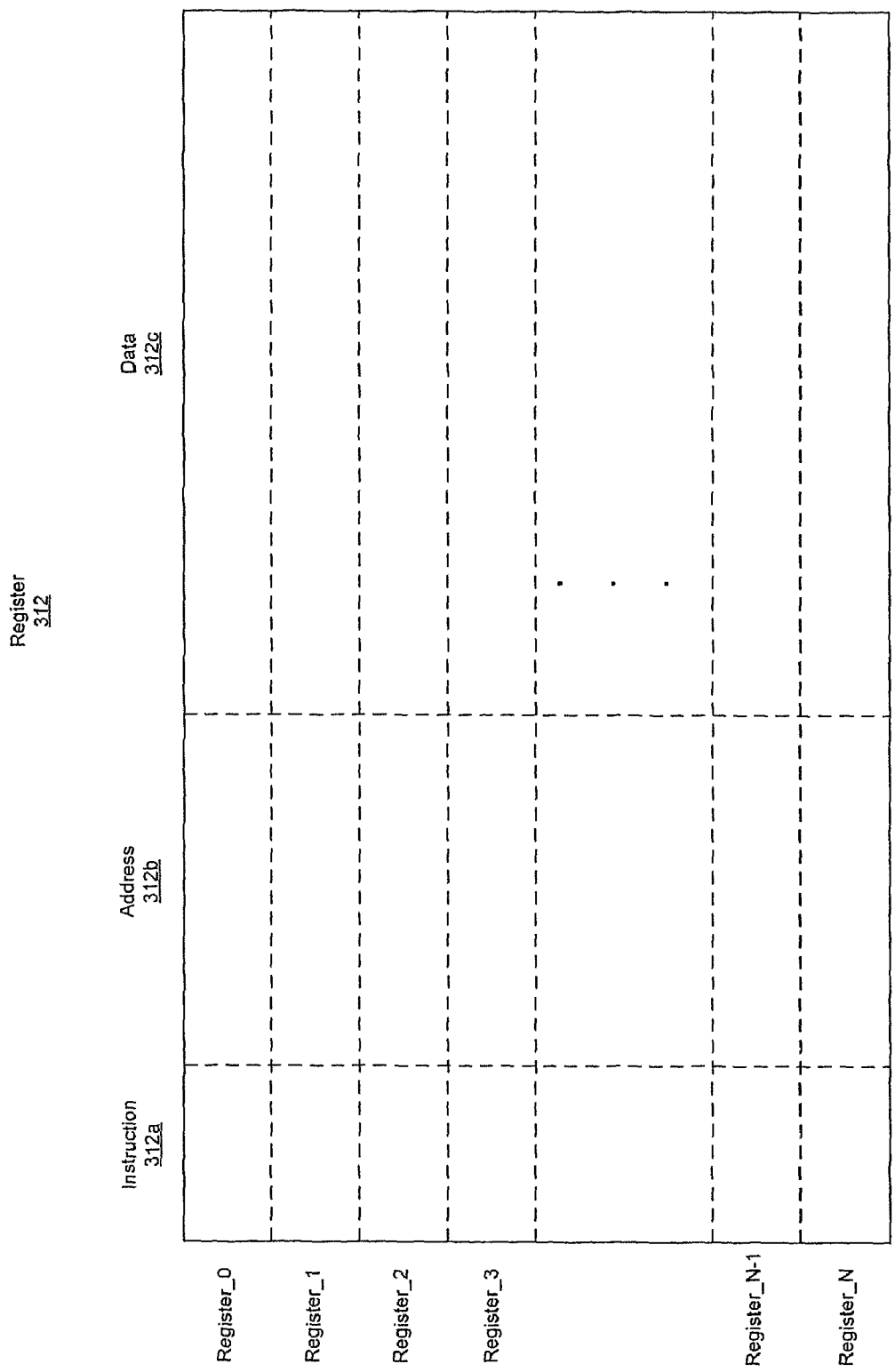
FIG. 3d is a diagram illustrating an exemplary register block used in FIG. 3a, in accordance with an embodiment of the invention.

FIG. 3d is a diagram illustrating an exemplary register block used in FIG. 3a, in accordance with an embodiment of the invention. Referring to FIG. 3d, there is shown the register block 312. The register block may comprise a plurality of register locations Register_0 . . . Register_N that may store data. The number of register locations may be a design decision. Each register location Register_0 . . . Register_N may be identified by an index, which may allow other devices to write to or read from specific locations in the register block 312.

The format of the index may be design dependent. For example, if the processor 210 has a 32-bit data bus, and each register location Register_0 . . . Register_N is a 32-bit location, then the index may specify a 32-bit space. However, if, for example, each register location Register_0 . . . Register_N specifies a 48-bit location, an index may specify a 64-bit space. This may allow two 32-bit data transfers for each register location with respect to the 32-bit data bus. However, the state machine block 316 may read the 48 bits of a register location as a single index data transfer.

The data stored in each register location may also comprise, for example, three fields. The three fields may be an instruction field 312a, an address field 312b, and a data field 312c. The instruction field may contain instructions that may indicate to the state machine block 316 what operations need to be performed. The address field 312b may indicate to the state machine block 316 the high-speed bus address from which to store data or the address from which to read data. The address may be, for example, for a memory location in the memory block 218. Other embodiments of the invention may use a different design for the register block 312. For example, there may be a different number of fields.

FIG. 3e illustrates exemplary instructions for the RFIC master, in accordance with an embodiment of the invention. Referring to FIG. 3e, there is shown eight instructions. For example, the instruction code "000" in the instruction field 312a may indicate that the data processor block 320 write the data in the data field 312c to a location indicated by the high-speed bus address in the address field 312b.

The instruction code "001" in the instruction field 312a may indicate that the data processor block 320 write the data in the accumulator 328 to a location indicated by the high-speed bus address in the address field 312b.

The instruction code "010" in the instruction field 312a may indicate that the data processor block 320 perform an OR operation on the data in the data field 312c and data in the location indicated by the high-speed bus address in the address field 312b. The result of the OR operation may be stored in, for example, the accumulator 328.

The instruction code "011" in the instruction field 312a may indicate that the data processor block 320 perform an AND operation on the data in the data field 312c and data in the location indicated by the high-speed bus address in the address field 312b. The result of the AND operation may be stored in, for example, the accumulator 328.

The instruction code "100" in the instruction field 312a may indicate that the data processor block 320 perform an OR operation on the data in the data field 312c and data in the location indicated by the high-speed bus address in the address field 312b. The result of the OR operation may be stored in, for example, the location indicated by the high-speed bus address in the address field 312b.

The instruction code "101" in the instruction field 312a may indicate that the data processor block 320 perform an AND operation on the data in the data field 312c and data in the location indicated by the high-speed bus address in the address field 312b. The result of the AND operation may be stored in, for example, the location indicated by the high-speed bus address in the address field 312b.

The instruction code "110" in the instruction field 312a may indicate that the data processor block 320 perform an XOR operation on the data in the data field 312c and data in the accumulator 328. The result of the XOR operation may be stored in, for example, the accumulator 328.

The instruction code "111" in the instruction field 312a may indicate that the data processor block 320 store the data in the data field 312c to the location indicated by the high-speed bus address in the address field 312b if the data in the accumulator 328 has a value of zero.

Figure 4:
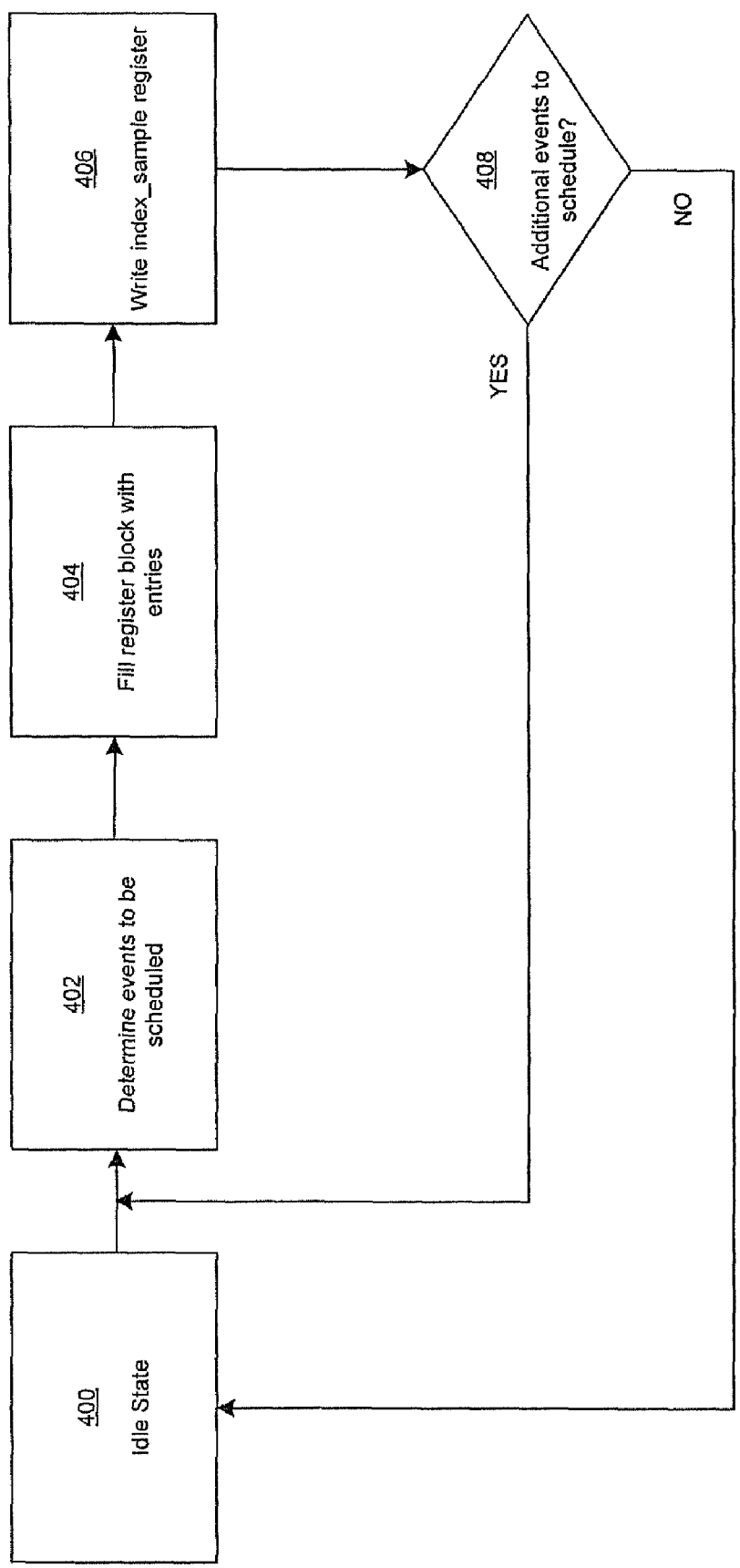
FIG. 4 is a flow diagram illustrating exemplary programming events, in accordance with an embodiment of the invention.

FIG. 4 is a flow diagram illustrating exemplary programming events, in accordance with an embodiment of the invention. Referring to FIG. 4, there is shown steps 400 to 408. In step 400, the processor 210 may be in an idle state with respect to the RFIC master block 220, where the processor 210 may not have any tasks related to the RFIC master block 220.

In step 402, the processor 210 may be in an active state with respect to the RFIC master block 220 where it may determine appropriate events that may need to be programmed in the RFIC master block 220. For example, an event may comprise ramping down power amplifiers when there is no need for transmission from the mobile terminal 105. In step 404, the processor 210 may write appropriate event data to the register block 312. An event may require one or more event data. The processor 210 may write event data for more than one event to the register block 312. The state machine block 316 may fetch and execute from one event data, then fetch and execute from the next event data sequentially until the state machine block 316 enters an idle state.

In step 406, the processor 210 may write data to the index-sample register 336 in the event detector 330. When the event detector 330 receives a timer count from the master timer block 236 that matches the reference event count in the index-sample register 336, the state machine block 316 may enter an active state. In step 408, the processor 210 may determine whether further events need to be programmed in the RFIC master block 220. If so, the next step may be step 402. Otherwise, the next step may be step 400.

Figure 5:
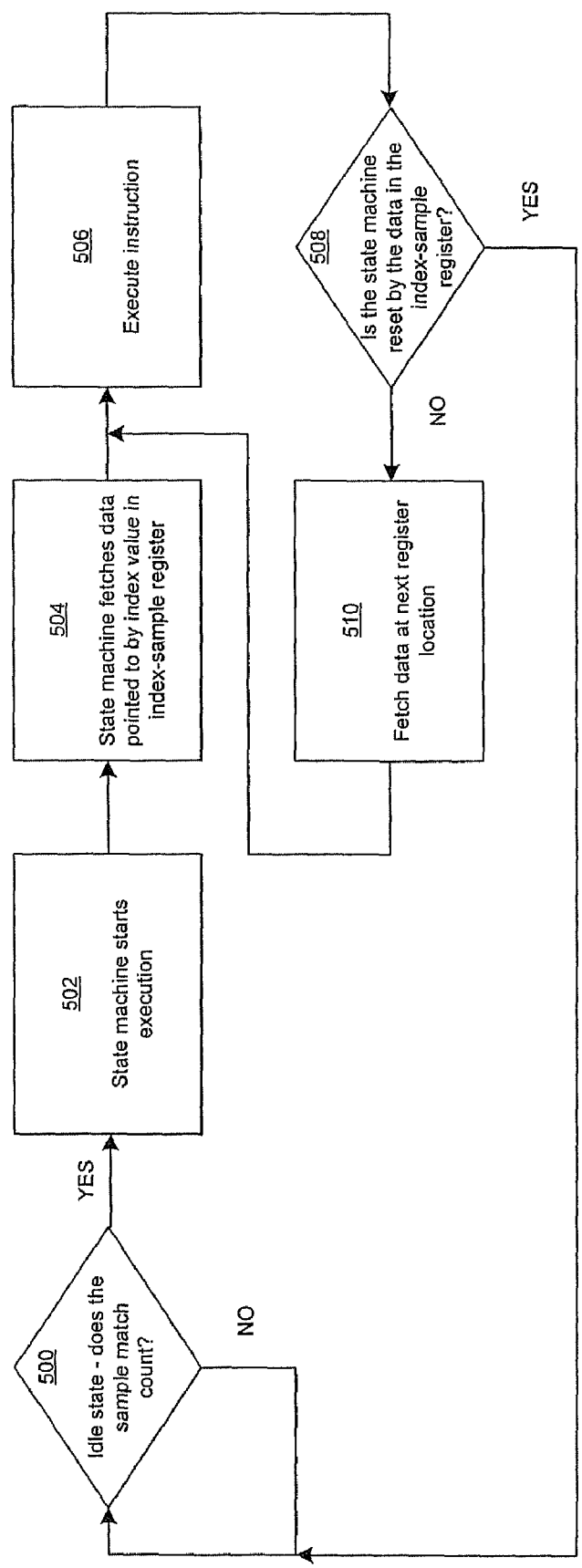
FIG. 5 is an exemplary flow diagram illustrating execution of commands for an event, in accordance with an embodiment of the invention.

FIG. 5 is an exemplary flow diagram illustrating execution of commands for an event, in accordance with an embodiment of the invention. Referring to FIG. 5, there is shown steps 500 to 510. In step 500, the state machine block 316 may be in an idle state because the event detector 330 may not have determined that the timer count from the master timer block 236 may be equal to the reference event count in the index-sample register 336. When the event detector 330 determines that the timer count from the master timer block 236 may be equal to the reference event count in the index-sample register 336, the state machine block 316 may enter an active state in step 502.

In step 504, the state machine block 316 may use the event data index in the index field 336c to fetch an event data from the register block 312. The event data may comprise an instruction field 312a, an address field 312b, and a data field 312c. In step 506, the instruction in the instruction field 312a may be executed by the state machine block 316. The instruction may use the address in the address field 312b and/or the data in the data field 312c. For example, the instruction corresponding to the instruction code "000" may store the data in the data field 312c to the address in the address field 312b.

In step 508, the state machine may be reset by the data in the index-sample register 336 if the data is a specified value. For example, an embodiment of the invention may use a data of all logical ones to reset the state machine block 316. For example, the last event data for an event, with no other events programmed, may write the specified data to the index-sample register 336. This may reset the state machine 316 to the idle state. Whether the state machine block 316 may be reset at any time or at certain states, such as, for example, after execution of an instruction in the event data, may be design dependent. If the state machine block 316 is to enter an idle state, the next step may be step 500. Otherwise, the next step may be step 510. In step 510, the state machine block 316 may fetch the event data that may be at the next sequential location. The next step may be step 506. In this manner, functions needed for an event may be executed by the RFIC master block 220.

In accordance with an embodiment of the invention, aspects of an exemplary system may comprise the RFIC master block 220, which may be integrated within a chip. The RFIC master block 220 may be configured by programming it with various data. The RFIC master block 220 may function as a bus master, and may control at least one device, which may be, on-chip or off-chip, via a device interface that is coupled to the bus. The device interface may be, for example, the GPIO block 230, the TWIF block 232, and/or the DAC control block 234. The RFIC master block 220, which may be coupled to, for example, at least one device interface, may control, for example, portions of the RF IC 110, via at least one signal generated by the RFIC master block 220. The signal may be communicated via the bus upon receiving an input timer signal from, for example, the master timer block 236.

The timer signal may comprise a count that may correlate to a number of WCDMA chip periods. For example, the timer signal count may be four times the number of WCDMA chips detected since the start of a present WCDMA slot. This timer signal may be communicated by the master timer block 236 during the awake periods. The timer signal may also comprise a count of a number of time periods during a stand-by period where the time period may be greater than a WCDMA chip period. This may allow smaller power dissipation during the stand-by period.

The RFIC master block 220 may be configured by writing at least one event data to, for example, the register block 312. The event data may comprise a data field, an address field, and a 3-bit instruction field. The RFIC master block 220 may also be configured by writing an index-sample data to, for example, index-sample register 336. The data written to the index-sample register 336 may comprises a count value and an event data index.

The state machine block 316 may fetch the event data in the register block 312 that may be specified by the event data index when the event detector 330 indicates that the count value in the index-sample register 336 equals a value of the timer signal communicated by the master timer block 236. The state machine block 316 may fetch the next sequential event data after executing the fetched event data. In this manner, the state machine block 316 may continue to fetch and execute instructions for an event or events. Alternatively, the state machine block 316 may enter an idle state if the index-sample register contains a specified value, such as, for example, all logical ones.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A system for operating circuitry in a mobile wireless communications device, comprising:
   one or more radio frequency integrated circuit (RFIC) chips that comprise a transmitter front end, a receiver front end and a baseband processor; and
   a controller integrated circuit (IC) chip coupled to the RFIC chip, the controller IC chip comprising a first processor, an RFIC controller, a general purpose input/output (GPIO) interface, a three-wire interface (TWIF) and a digital-to-analog converter (DAC) control interface, a timer and a bus,
   wherein the first processor, the RFIC controller, the GPIO interface, the TWIF, the DAC control interface and the timer are coupled to the bus,
   wherein the first processor communicates over the bus with the RFIC controller,
   wherein the RFIC controller communicates over the bus with the GPIO interface, the TWIF and the DAC control interface,
   wherein the RFIC controller communicates with the RFIC chip via at least the GPIO interface, the TWIF and the DAC control interface, and
   wherein the timer comprises a wideband code division multiple access (WCDMA) timer and a global system for mobile communications (GSM) timer and provides a timing count to the RFIC controller, and
   wherein the timing count correlates to a number of WCDMA chip periods.

2. The system according to claim 1,
   wherein the bus comprises a first bus and a second bus that are coupled via a bridge,
   wherein the first bus is a higher speed bus with respect to the second bus,
   wherein the first processor, the RFIC controller and a memory are coupled to the first bus, and
   wherein the timer, the GPIO interface, the TWIF and the DAC control interface are coupled to the second bus.

3. The system according to claim 2, wherein the timer is directly connected to the RFIC controller.

4. The system according to claim 2, wherein the RFIC controller is coupled to the second bus.

5. The system according to claim 4, wherein the RFIC controller comprises an event detector, a second processor, a state machine and a first register.

6. The system according to claim 5, wherein the event detector is in communication with the timer and the first processor.

7. The system according to claim 5, wherein the first register is in communication with the first bus and the second bus.

8. The system according to claim 5, wherein the first register stores data received from the first processor and provides the data to the second processor.

9. The system according to claim 8, wherein the first register receives the data from the first processor via the second bus and the second processor provides processed data via the first bus.

10. The system according to claim 5, wherein the second processor comprises at least two multiplexers that are controlled by the state machine.

11. The system according to claim 5, wherein the event detector comprise a first comparator, a second comparator and a multiplexer, the multiplexer receiving a first count and a second count, the first count being clocked at a faster rate than the second count, the first count and the second count being provided by the timer.

12. The system according to claim 11,
wherein the event detector comprises a second register, and
wherein the first comparator receives an output of the multiplexer and a first value from the second register.

13. The system according to claim 12, wherein the second comparator receives a second value from the timer and a third value from the second register.

14. The system according to the claim 13, wherein an output of the event detector is coupled to an input of the state machine.

15. The system according to claim 12, wherein the second register receives data from the first processor.

16. The system according to claim 1, wherein the timing count that correlates to the number of WCDMA chip periods is referenced to a start of a WCDMA slot.

17. The system according to claim 1, wherein the one or more RFIC chips is a single RFIC chip.

18. The system according to claim 1, wherein the mobile wireless communications device is a cellular phone.

19. A system for operating circuitry in a mobile wireless communications device, comprising:

one or more radio frequency integrated circuit (RFIC) chips that comprise a transmitter front end, a receiver front end and a baseband processor; and a controller integrated circuit (IC) chip coupled to the RFIC chip, the controller IC chip comprising a first processor, an RFIC controller, a general purpose input/output (GPIO) interface, a three-wire interface (TWIF) and a digital-to-analog converter (DAC) control interface, a timer and a bus, wherein the first processor, the RFIC controller, the GPIO interface, the TWIF, the DAC control interface and the timer are coupled to the bus, wherein the first processor communicates over the bus with the RFIC controller, wherein the RFIC controller communicates over the bus with the GPIO interface, the TWIF and the DAC control interface, wherein the RFIC controller communicates with the RFIC chip via at least the GPIO interface, the TWIF and the DAC control interface, wherein the timer comprises a wideband code division multiple access (WCDMA) timer and a global system for mobile communications (GSM) timer and provides a timing count to the RFIC controller, and wherein the timing count comprises a count of a number of time periods, wherein the time periods are greater than WCDMA chip periods.

* * * * *